United States Patent
Brown et al.

(10) Patent No.: US 7,578,764 B2
(45) Date of Patent: Aug. 25, 2009

(54) THRUST BEARING

(75) Inventors: James Kevin Brown, Rock Hill, SC (US); Eric Clark, Rock Hill, SC (US)

(73) Assignee: Schaeffler KG, Herzogenaurach (DE)

( * ) Notice: Subject to any disclaimer, the term of this patent is extended or adjusted under 35 U.S.C. 154(b) by 461 days.

(21) Appl. No.: 11/456,941

(22) Filed: Jul. 12, 2006

(65) Prior Publication Data

US 2007/0161454 A1    Jul. 12, 2007

Related U.S. Application Data

(60) Provisional application No. 60/698,425, filed on Jul. 12, 2005.

(51) Int. Cl.
*F16H 57/04* (2006.01)
*F16H 57/08* (2006.01)
*F16C 33/581* (2006.01)

(52) U.S. Cl. .......................... 475/331; 475/159; 384/622

(58) Field of Classification Search ................. 475/331; 384/620–622
See application file for complete search history.

(56) References Cited

U.S. PATENT DOCUMENTS

| 2,891,828 | A |   | 6/1959 | Winchell |             |
|-----------|---|---|--------|----------|-------------|
| 4,466,751 | A | * | 8/1984 | Higuchi  | ....... 384/126 |
| 4,981,373 | A |   | 1/1991 | Bando    |             |
| 5,335,998 | A | * | 8/1994 | Muntnich et al. | ...... 384/622 |
| 5,489,255 | A | * | 2/1996 | Hinckley et al. | ...... 384/620 |
| 7,182,521 | B2 | * | 2/2007 | Muntnich et al. | ...... 384/606 |

FOREIGN PATENT DOCUMENTS

| DE | 3643584 | 8/1987 |
| DE | 3840957 | 7/1989 |
| DE | 3914175 | 11/1989 |

* cited by examiner

*Primary Examiner*—Tisha D Lewis
(74) *Attorney, Agent, or Firm*—Volpe and Koenig, P.C.

(57) ABSTRACT

A thrust bearing (16) for transmitting axial thrust forces between at least two gear parts (1, 5) rotating relative to each other in a gear arrangement is provided, with two coaxial, opposing race disks (17, 18) holding a cage (6) with a plurality of roller bodies (7) with radial play. To prevent discharge of lubricant to the greatest possible extent radially from the thrust bearing (16) and accordingly to be able to guarantee a sufficient axial supply of lubricant to the gear arrangement, it is provided that one race disk (17) has a smaller outer diameter than the other race disk (18), that both race disks (17, 18) each have external collars (19, 20) on the radially outer edge that extend axially inwardly, and the external collar (19) of the race disk (17) with the smaller outer diameter is covered axially by the external collar (20) of the race disk (18) with the greater outer diameter, such that an extensive encapsulation of the thrust bearing (16) against lubricant passage is guaranteed.

4 Claims, 3 Drawing Sheets

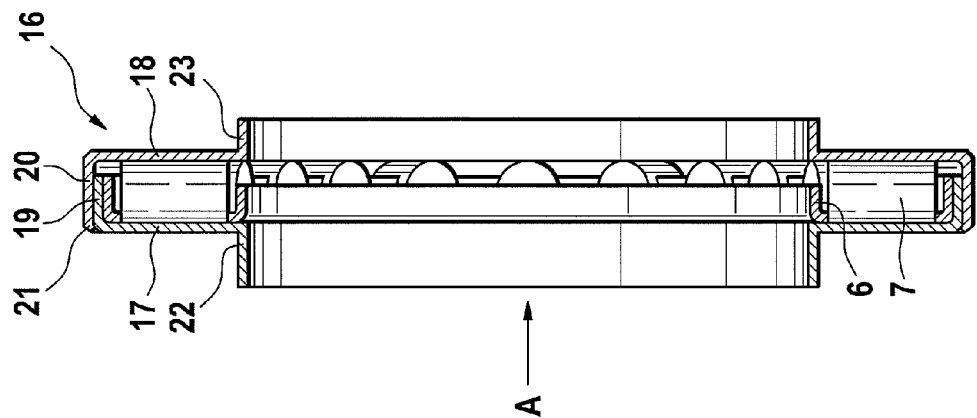
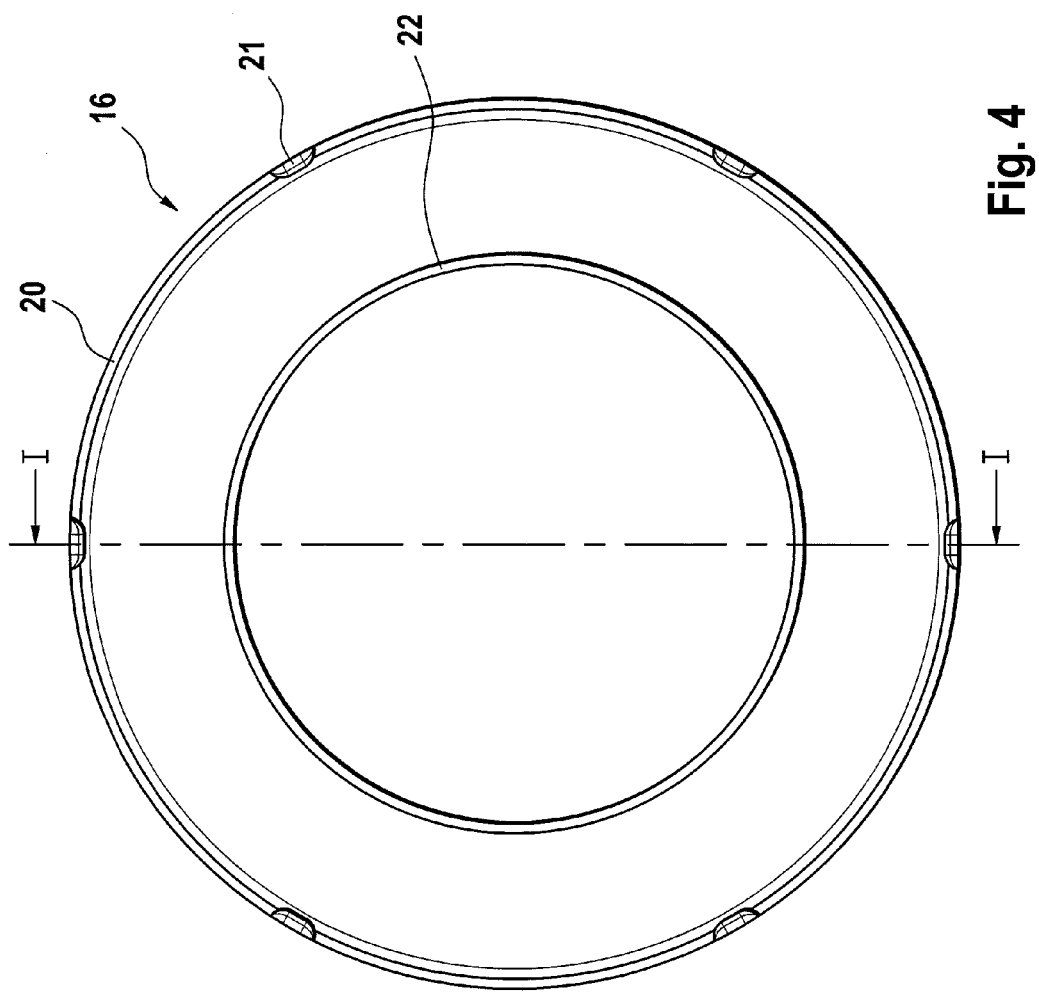

THRUST BEARING

CROSS-REFERENCE TO RELATED APPLICATIONS

This application claims the benefit of U.S. application No. 60/698,425, filed Jul. 12, 2005, which is incorporated herein by reference as if fully set forth.

FIELD OF THE INVENTION

The invention relates to a thrust bearing for transmitting axial forces between at least two gear parts, which can rotate relative to each other, in a gear arrangement, with two disks arranged coaxially opposite each other and holding a cage with a plurality of roller bodies with radial play.

BACKGROUND

Thrust bearings have been used for a long time for many purposes and are used essentially for absorbing axial thrust loads. According to the specific application, different variants are known, with these being directed predominantly for the requirement of the least possible installation space as well as the realization as a compact and preferably closed structural unit. In this respect, for examples refer to the publications U.S. Pat. No. 2,891,828, U.S. Pat. No. 4,981,373, DE 36 43 584 A1, DE 38 40 957 A1, and DE 39 14 175 A1.

Thrust bearings are also used in known automatic transmissions in motor vehicles, for example, for axial support of the sun wheel on a planet carrier of a planetary gear unit. However, in practice it has been shown that for conventional standard bearings, as disclosed, for example, by the above-noted publications, lubricant can flow radially through the thrust bearing and, in a disadvantageous way, is no longer available or only in a quantity that is too little for the actual purpose, namely a defined axial supply to the differential gear unit of the motor vehicle.

It was further recognized that during the operation of an automatic transmission, in planetary gear construction, an axial thrust load is generated on the sun wheel of the planetary gear, by means of which this sun wheel can move away from the thrust bearing, possibly in the axial direction. This state is noted only when driving in forward gears (when idling or driving in reverse gear, a thrust force is generated in the reverse direction), but due to these conditions, lubricant can also flow away radially in an undefined way through open spaces between the thrust bearing and the corresponding support surfaces. This is where the invention described below begins.

SUMMARY

The invention is based on the objective of creating a thrust bearing for transmitting axial thrust forces between at least two gear parts rotating relative to each other in a gear arrangement, which prevents to the greatest possible extent radial discharge of lubricant and accordingly guarantees sufficient axial supply of lubricant to other points of the gear arrangement.

According to the invention, a thrust bearing for transmitting axial thrust forces between at least two gear parts rotating relative to each other in a gear arrangement is provided, with two coaxial, opposing race disks holding a cage with a plurality of roller bodies with radial play therebetween. The stated objective is met according to the invention in that one race disk has a smaller outer diameter than the other race disk, and that both race disks each have on a radially outer side an external collar that extends axially inward, and in that the external collar of the race disk with the smaller outer diameter is covered axially by the external collar of the race disk with the larger outer diameter, such that the greatest possible encapsulation of the thrust bearing against radial lubricant passage is guaranteed.

Through these measures, a bearing, which is closed or encapsulated to the greatest possible extent is created, which substantially prevents undefined passage of lubricant through this bearing.

The dependent claims describe preferred improvements or configurations of the invention.

Accordingly, the external collar of the race disk with a greater outer diameter has, at least in sections, one or more projections, which are already or will be bent radially inwardly and which permit, on their side, a positive fit of the race disk with the larger outer diameter with the race disk with the smaller outer diameter through a snap-on or gripping engagement.

As the invention further provides, the race disks can have radially inner internal collars, which are continuous over the inner periphery and which extend axially outwardly, wherein each inner collar extends radially into an annular recess or groove of an adjacent gear part of the gear arrangement, such that, first, within limits a relative motion in the axial direction between the thrust bearing and also at least one adjacent gear part is possible, and second, a radial lubricant passage between at least one adjacent gear part and the outer surface of the corresponding race disk is prevented to the greatest possible extent.

Through these measures, a simple labyrinth seal is created, which effectively hinders or completely prevents, on its side, an outflow of lubricant between the one or more gear parts adjacent to the thrust bearing and the corresponding race disk.

Furthermore, it is useful to select different dimensions for the axial extent of the internal collar, which effectively supports perfect assembly of the thrust bearing.

Finally, it is proposed that one or more adjacent gear parts are an end drive sun wheel of a planetary gear unit, which is supported via the described thrust bearing axially on a gear part in the form of a planet carrier or a differential gear housing formed as a planet carrier, wherein the internal collar that extends axially outwardly from one race disk of the thrust bearing engages in an annular recess or groove of the end sun wheel, and the internal collar that extends axially outwardly from the other race disk engages in an annular recess or groove of a planet carrier or differential gear housing or a conical gear wheel of the differential gear unit.

BRIEF DESCRIPTION OF THE DRAWINGS

The invention is explained in more detail below with reference to the attached drawing using a few embodiments. Shown therein are:

FIG. 4 is a detail view of the thrust bearing from FIG. 3, indicated at "A"; and FIG. 5 is a section V-V through the thrust bearing shown in FIG. 4.

DETAILED DESCRIPTION OF THE PREFERRED EMBODIMENTS

Figure 1:
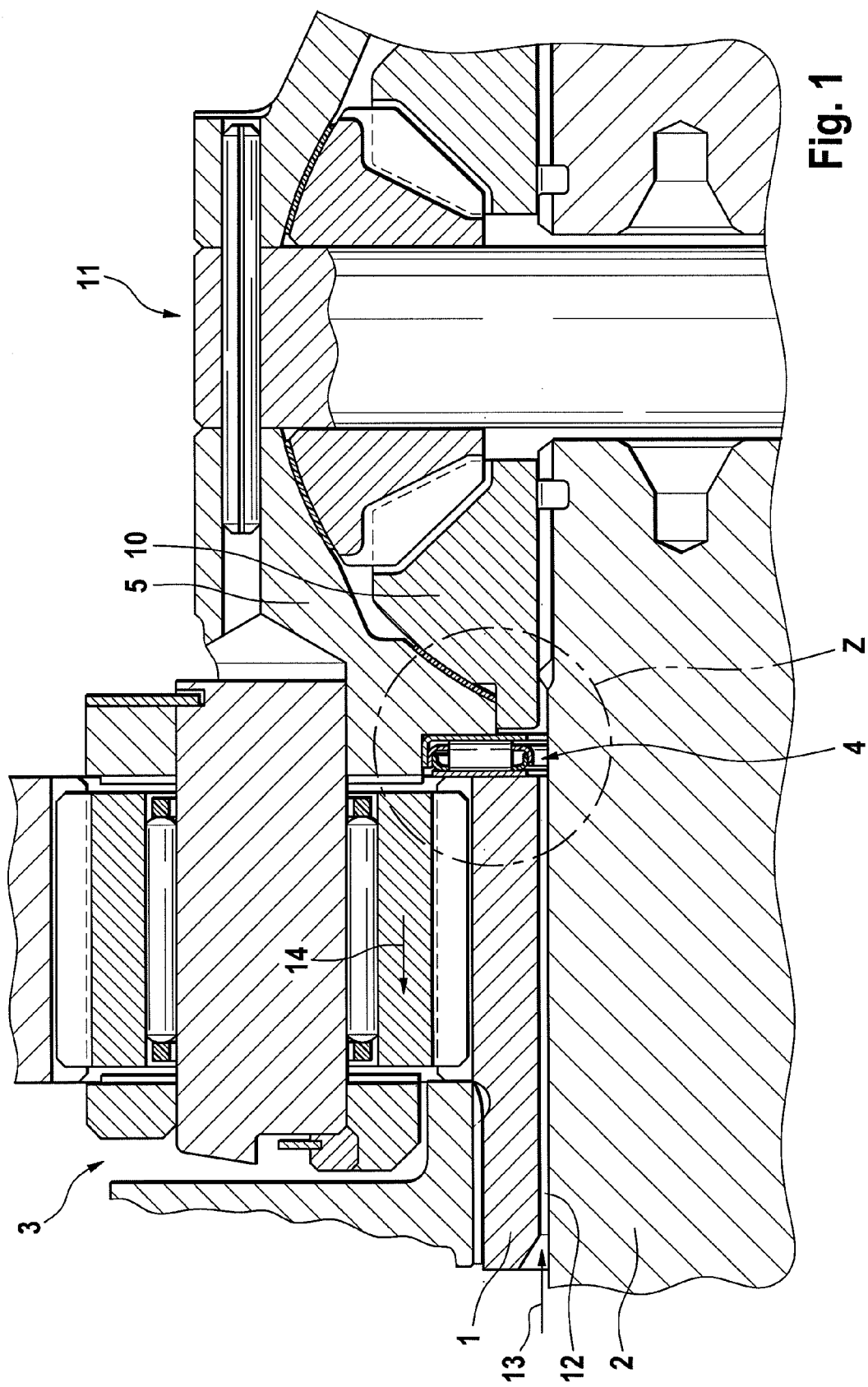
FIG. 1 is a view of a gear arrangement of an automatic transmission with a conventional thrust bearing according to the state of the art.

FIG. 1 shows a longitudinal section of a selected portion of a known gear arrangement in a motor vehicle in the form of an automatic transmission. In this gear arrangement, a first gear part 1 in the form of an end drive sun wheel of a planetary gear 3 enclosing a shaft 2 is supported via a thrust bearing 4 axially on a second gear part 5 in the form of a planet carrier or a housing of a differential gear unit 11 holding a planet carrier.

Figure 2:
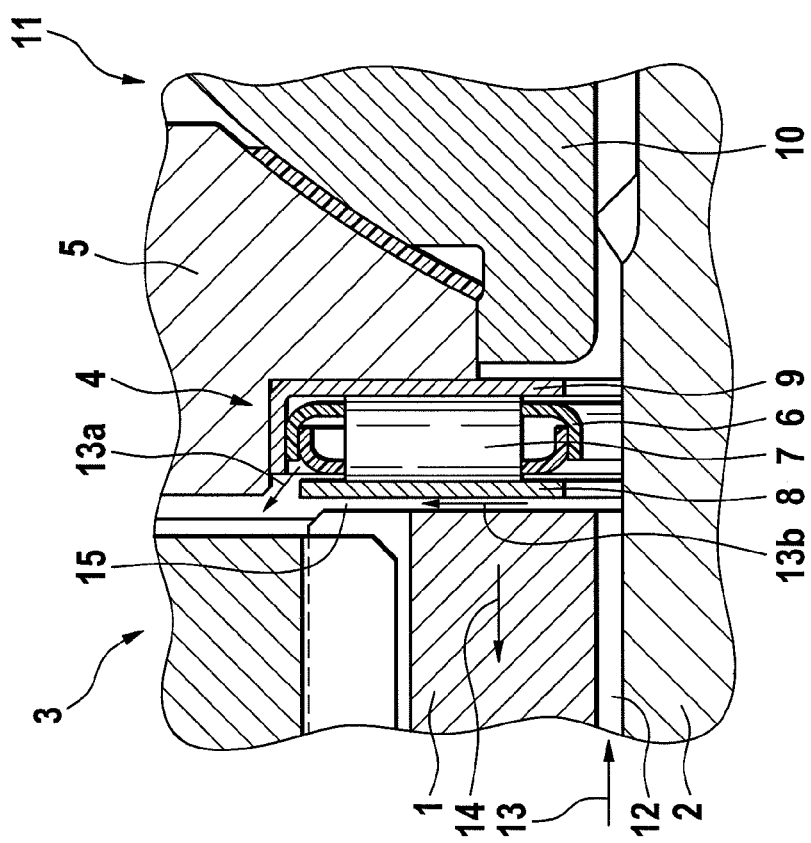
FIG. 2 is an enlarged view of the detail "Z" from FIG. 1.

The thrust bearing 4 essentially comprises two coaxial, opposing race disks 8 and 9 holding a cage 6 with a plurality of roller bodies 7 with radial play therebetween (FIG. 2). A gear part 10 in the form of a conical gear wheel of the differential gear unit 11 is arranged axially adjacent to the thrust bearing 4.

In a lubricant channel 12 formed between the shaft 2 and the first gear part 1 (end drive sun wheel), lubricant is fed axially in the direction of arrow 13 to the differential gear unit 11. As already discussed above, in practice it has been shown that for standard, conventional thrust bearings, which are open to a great extent, a lubricant portion can flow out according to arrow 13*a* (FIG. 2) radially through the thrust bearing 4 and, in a disadvantageous way, is no longer available for the actual purpose, namely the defined axial supply to the differential gear unit 11.

It was further recognized that during the operation of the automatic transmission, an axial load is generated on the end drive sun wheel 1 of the planetary gear unit 3, by means of which this sun wheel can possibly separate axially from the thrust bearing 4 in the direction of arrow 14. This state is definitely noted only while driving in forward gears, while when idling or driving in reverse gear, a thrust force is produced in the reverse direction, but due to these conditions, lubricant can flow out according to arrow 13*b* through free spaces 15 radially between the thrust bearing 4 and the corresponding support surfaces of the end drive sun wheel 1 (FIG. 2).

Figure 3:
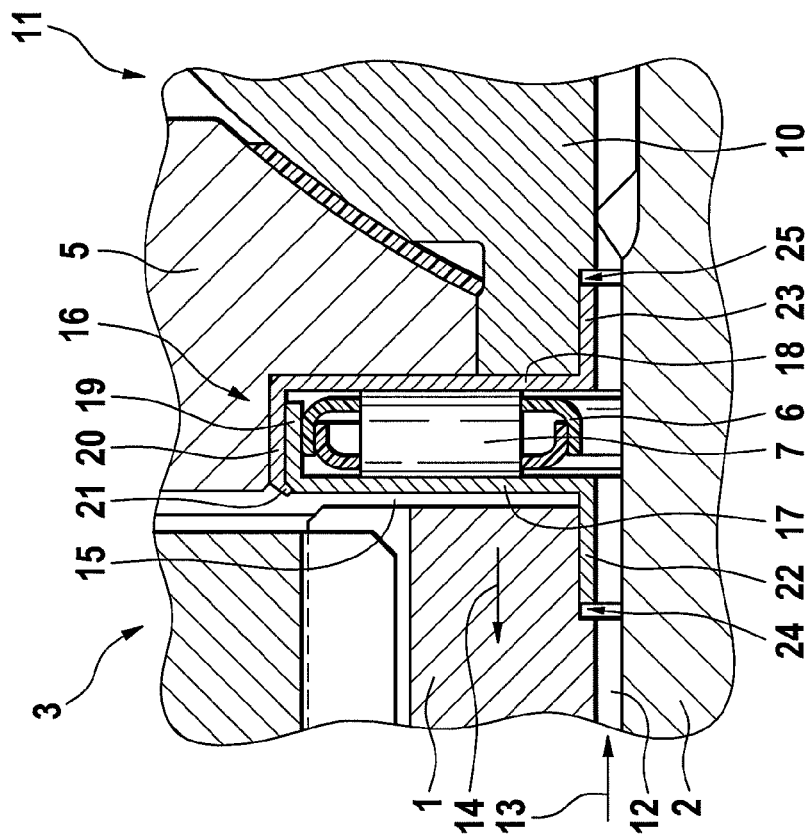
FIG. 3 is a view of a thrust bearing according to the invention in the installed state.

To effectively address this problem now, according to FIGS. 3 to 5, an improved thrust bearing 16 is provided, which shall replace the conventional thrust bearing 4. The thrust bearing 16 differs from the known thrust bearing 4 initially in that one race disk 17 has a smaller outer diameter than the other race disk 18, and that both race disks 17, 18 each have an external collar 19 and 20, respectively, at the radially outer edge which extends axially inwardly.

The external collar 19 of the race disk 17 with a smaller outer diameter and arranged at the left in FIG. 3 is now covered axially by the external collar 20 of the race disk 18 with a greater external diameter, such that an extensive encapsulation of the thrust bearing 16 against a radial lubricant passage (arrow 13*a* from FIG. 2) through this bearing is guaranteed. The lubricant outflow 13*a* shown in FIG. 2 is now effectively blocked.

The external collar 20 of the race disk 18 with the greater outer diameter has at least in sections one or more, in the present case six, projections 21, which are uniformly distributed over the periphery, which are also already or will be bent radially inwards, and which, on their side, permit a positive fit between the race disks 17, 18 through snap-on or gripping engagement during the completion of the thrust bearing 4 to form a compact structural unit that is closed to the greatest possible extent (FIG. 4 and FIG. 5).

As further emerges from FIGS. 3 to 5, the race disks 17, 18 are each provided with an internal collar 22 and 23 on a radially inner edge, respectively, which is continuous over the inner periphery, which extends in the outward direction, and which, on the respective sides, each engage in an annular recess 24, 25 of an adjacent gear part 1 and 10.

According to the present embodiment, the internal collar 22 of the race disk 17 with the smaller outer diameter engages in the recess 24 of the end drive sun wheel 1 and the internal collar 23 of the race disk 18 with the greater outer diameter engages in the recess 25 of the adjacent gear part 10 in the form of a conical gear wheel or the housing of the differential gear unit 11.

In this way, a labyrinth seal is created, which, on its side, essentially prevents radial passage of lubricant through an open space 15, as can occur in conventional thrust bearings 4 from FIG. 2, especially when driving in forward gears.

However, it is also conceivable and included by the invention, instead of the described annular recess 24 or 25, to provide an annular groove for modified internal collars, which, on their side, further improve the effect of the labyrinth seal (not shown in more detail).

Assuming that the thrust bearing 16 is also displaced towards the left and axially separated from the supporting planet carrier 5, here an undesired passage of lubricant is also prevented, but at least effectively hindered, because a labyrinth seal is also formed by the inner collar 23 of the race disk 18 in connection with the annular recess 25 in the gear part 10 (conical gear wheel or differential gear housing) (not shown in more detail).

As a result, blocking or limiting of the outflow of lubricant through the thrust bearing 16 and open spaces 15 is guaranteed. Consequently, as desired, the majority of the lubricant is forced to flow axially to the differential gear unit 11 and permits a sufficient lubrication.

FIGS. 3 and 5 show internal collars 22, 23 of the race disks 17, 18, which are formed with different lengths and which have proven to be advantageous in terms of perfect assembly of the thrust bearing 16.

REFERENCE SYMBOLS

1 Gear part (end drive sun wheel)
2 Shaft
3 Planetary gear
4 Thrust bearing
5 Gear part, planet carrier, differential gear housing
6 Cage
7 Roller body
8 Race disk
9 Race disk
10 Gear part, conical gear wheel
11 Differential gear unit
12 Lubricant channel
13 Directional arrow (lubricant supply)
13*a* Lubricant portion flowing out in an undefined way
13*b* Lubricant portion flowing out in an undefined way
14 Directional arrow of possible axial movement of the gear part 1 when driving in forward gears
15 Open space
16 Thrust bearing
17 Race disk
18 Race disk
19 External collar
20 External collar
21 Projection
22 Internal collar
23 Internal collar
24 Recess
25 Recess

The invention claimed is:

1. Thrust bearing for transmitting axial forces between at least two gear parts rotating relative to each other in a gear arrangement, comprising two coaxial, opposing race disks holding a cage with a plurality of roller bodies with radial play therebetween, a first one of the race disks has a smaller outer diameter than the second one of the race disks, the race disks each have external collars on a radially outer edge thereof that extend axially inwardly, and the external collar of the first race disk with the smaller outer diameter is covered axially by the external collar of the second race disk with the greater diameter, such that an encapsulation of the thrust bearing against lubricant loss is provided, the race disks each have an internal collar on a radially inner edge thereof, which is continuous over an inner periphery and which extends axially outwards, and each of the internal collars extends radially into a respective annular recess or groove of an adjacent gear part of the gear arrangement, such that, first, within limits a relative motion in the axial direction between the thrust bearing and at least one adjacent gear part is possible, and second, a radial lubricant passage between the one or more adjacent gear parts and an outer surface of the corresponding race disk is essentially prevented.

2. Thrust bearing according to claim 1, wherein the external collar of the second race disk with the greater outer diameter has at least in sections one or more projections, which are bent or are adapted to be bent radially inwardly and which permit a positive fit of the second race disk with the greater outer diameter to the first race disk with the smaller outer diameter through a snap-on or gripping engagement.

3. Thrust bearing according to claim 1, wherein a dimension of an axial extent of the internal collar is varied.

4. Thrust bearing in an automatic transmission of a motor vehicle according to claim 1, wherein the one or more adjacent gear parts are an end drive sun wheel of a planetary gear, which is supported via the thrust bearing axially on a gear part which comprises a planet carrier, wherein the internal collar that extends axially outwardly from the first race disk of the thrust bearing engages in an annular recess or groove of the end sun wheel, and the internal collar extends axially outwardly from the second race disk engages in an annular recess or groove of another adjacent gear part which comprises a conical gear wheel or housing of a differential gear unit.

* * * * *